(12) United States Patent
Shiel

(10) Patent No.: US 10,576,560 B2
(45) Date of Patent: Mar. 3, 2020

(54) BAND SAW WITH TWISTING BLADE

(71) Applicants: Robert Bosch Gmbh, Stuttgart (DE); Robert Bosch LLC, Farmington Hills, MI (US)

(72) Inventor: William J. Shiel, Bartlett, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/946,510

(22) Filed: Apr. 5, 2018

(65) Prior Publication Data

US 2019/0308259 A1 Oct. 10, 2019

(51) Int. Cl.
*B23D 55/08* (2006.01)
*B23D 55/10* (2006.01)
*B23D 53/06* (2006.01)

(52) U.S. Cl.
CPC .......... *B23D 55/082* (2013.01); *B23D 55/10* (2013.01); *B23D 53/06* (2013.01)

(58) Field of Classification Search
CPC ...... B23D 55/00; B23D 55/02; B23D 55/023; B23D 55/026; B23D 55/08; B23D 55/082; B23D 55/086; B23D 55/088; B23D 55/10; B27B 13/04
See application file for complete search history.

(56) References Cited

U.S. PATENT DOCUMENTS

| | | | | |
|---|---|---|---|---|
| 2,843,917 A | * | 7/1958 | Crane | B23D 59/006 |
| | | | | 83/797 |
| 4,926,731 A | * | 5/1990 | Kawabata | B23D 53/04 |
| | | | | 269/172 |
| 5,410,934 A | * | 5/1995 | Krippelz | B23D 55/082 |
| | | | | 83/820 |
| 7,849,604 B2 | | 12/2010 | McIntosh et al. | |
| 8,245,616 B2 | | 8/2012 | Jourdan | |
| 10,027,348 B2 | * | 7/2018 | Cai | H03M 13/2918 |
| 2006/0144207 A1 | * | 7/2006 | Nortmann | B23D 55/026 |
| | | | | 83/809 |
| 2011/0072949 A1 | * | 3/2011 | Jourdan | B23D 55/082 |
| | | | | 83/820 |
| 2017/0355029 A1 | | 12/2017 | Myers et al. | |

FOREIGN PATENT DOCUMENTS

| | | | | |
|---|---|---|---|---|
| DE | 2919036 A1 | * | 11/1980 | ........... B23D 55/026 |
| GB | 705405 A | * | 3/1954 | ............. B23D 53/02 |

* cited by examiner

*Primary Examiner* — Jennifer B Swinney
(74) *Attorney, Agent, or Firm* — Maginot, Moore & Beck LLP

(57) ABSTRACT

A band saw includes a first blade guide assembly and a second blade guide assembly which guide the band saw blade through a cutting zone. The first blade guide assembly and the second blade guide assembly are each supported for pivotal movement about a pivot axis between a first angular position and a second angular position. At the first angular position, the first and the second blade guide assemblies hold the band saw blade at a first angle with respect to the wheel contact plane. At the second angular position, the first and the second blade guide assemblies hold the band saw blade at a second angle with respect to the wheel contact plane, the second angle being different than the first angle.

11 Claims, 4 Drawing Sheets

BAND SAW WITH TWISTING BLADE

TECHNICAL FIELD

The disclosure relates generally to band saws, and in particular to guide assemblies and tensioning assemblies for band saws.

BACKGROUND

Unless otherwise indicated herein, the materials described in this section are not prior art to the claims in this application and are not admitted to the prior art by inclusion in this section.

Different types of band saws are suited for different types of tasks. This is due in part to the angle of the blade with respect to the tangential wheel contact plane. The angle of the blade controls the direction of movement of a workpiece with respect to the frame of the band saw. Existing vertical band saws, designed for rip cutting and contour cutting, feature a blade angle of 0° relative to the tangential wheel contact plane. Hand held portable band saws, designed for cross cutting pipe and bar, feature a 45° blade angle relative to the tangential wheel contact plane. Horizontal band saws feature either a 0° blade angle for saw mill rip cuts, or u p to a 90° blade angle and a pivot for cross cutting.

On one hand, the capacity to perform cross cuts on a vertical band saw with a blade angle of 0° is very limited. On the other hand, the capacity to perform rip cuts on a band saw having a blade angle of 45° or 90° is al so very limited. What is needed is a tool with variable blade angle which can satisfy both high capacity rip cutting and cross cutting needs, and that can be switched between blade angles in a simple and efficient manner while taking into account changes in blade tension due to blade twist.

DETAILED DESCRIPTION

Figure 1:
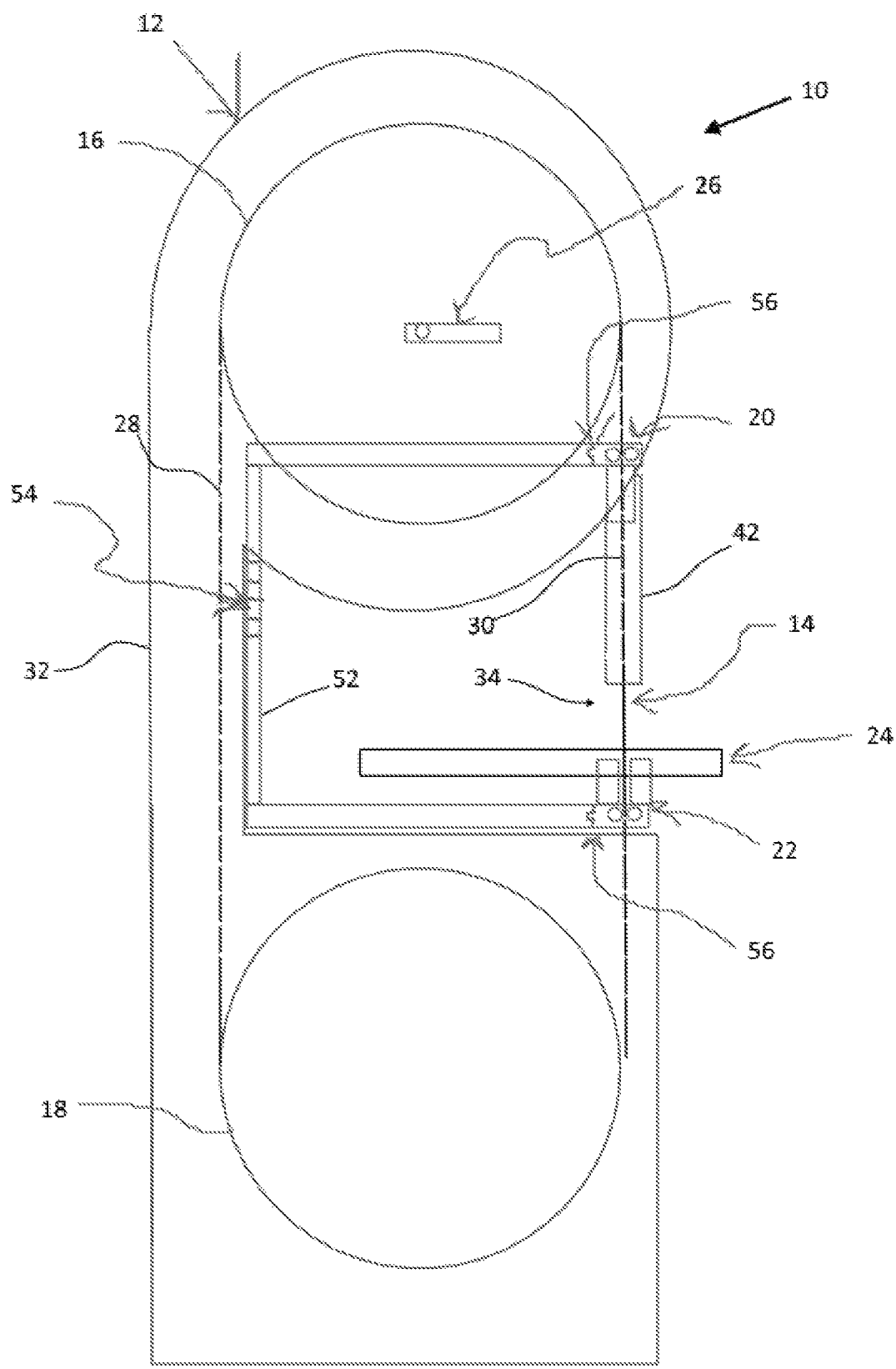
FIG. 1 is a schematic side view of a band saw in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

The disclosure is directed to a band saw having pivoting blade guide assemblies that enable a plurality of blade angles relative to the drive wheel contact plane. A 0° blade angle allows for long rip style cuts while a 45° or 90° blade angle allows for greater capacity of thru cuts of long material. The band saw includes a three position tensioning mechanism which allows the blade to be appropriately tensioned based on the degree of twist. With the blade unlocked a lever arm can be actuated to articulate upper and lower blade guards to twist the blade. With the blade in place and tensioned the hinged twist arm can pivot out of the way allowing full cutting capacity.

FIG. 1 depicts and embodiment of a band saw 10 in accordance with the present disclosure. The band saw 10 of FIG. 1 is a vertical band saw. The teachings of the present disclosure may be applied to other configurations of band saws including horizontal band saws, portable band saws, and the like. The band saw 10 includes a frame 12, a band saw blade 14, wheels 16, 18, a drive system (not shown), blade guide assemblies 20, 22 and a table 24.

The frame 12 provides the structure that supports and positions the wheels 16, 18, guides 20, 22 and table 24 with respect to each other. The frame 12 is typically formed of metal, such as cast iron or welded steel, and may have any suitable configuration. The wheels 16, 18 support and position the band saw blade 14 and define the path of movement of the blade 14. When wrapped around the wheels 16, 18, the body of the blade 14 is configured to lie flat against the outer surface of the wheels 16, 18. The wheels 16, 18 define a tangential wheel contact plane with the blade that is parallel to the axes of rotation of the wheels.

At least two wheels are used to support and guide the blade. For a vertical band saw, such as depicted in FIG. 1, the two wheels 16, 18 comprise an upper wheel 16 and a lower wheel 18. The frame 12 forms enclosures for the wheels 16, 18 which are referred to as wheel houses. The band saw 10 includes a blade tensioning mechanism 26 that enables the blade to be tensioned for cutting and the blade tension to be released to allow removal and replacement of the blade as needed. As part of the tensioning system, the upper wheel 16, and sometimes the lower wheel 18, is configured to be raised and lowered to adjust the tension of the blade 14. The blade tensioning mechanism 26 comprises a mechanism, such as a wheel or lever, that can adjust the vertical position of the wheel 16 to bring about the desired amount of tension in the blade.

The lower wheel 18 is coupled to the drive system and is used to drive the blade to rotate. The drive system includes a motor (not shown) which may be enclosed in the wheel house. The lower wheel 18 may be mounted directly to the motor arbor or may be coupled to the arbor by pulleys and a belt.

When wrapped around the wheels 16, 18, the band saw blade 14 includes two straight tensioned portions 28, 30 which extend between the wheels 16, 18 on opposing sides. One of these strands is the rear strand 28 which is enclosed in a column 32 of the frame 12 that extends between the upper and lower wheel houses. The front strand 30 is used for cutting and is therefore left at least partially exposed. The table 24 is positioned to support a workpiece in the path of movement of the exposed portion 30 of the blade 14. The table 24 includes a slit (not shown) through which the blade extends. The table 24 may be supported by a trunnion that enables the table to be tilted, or beveled, about a bevel axis. The trunnion is configured so that the bevel axis is parallel to the plane of the blade 14.

Figure 3:
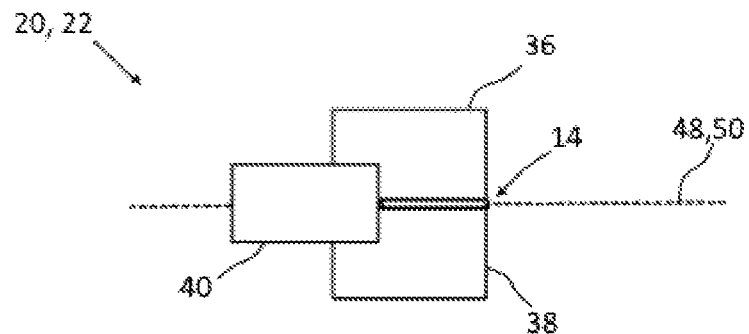
FIG. 3 is a schematic illustration showing the blade guide assemblies of the band saw of FIG. 1 at a first angular position.
Figure 4:
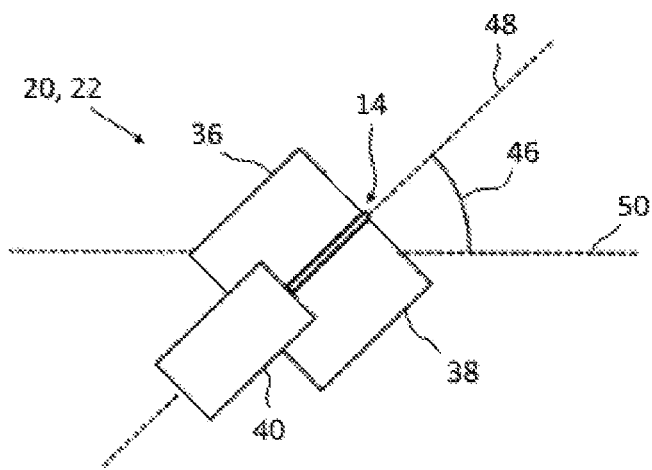
FIG. 4 is a schematic illustration showing the blade guide assemblies of the band saw of FIG. 1 at a second angular position.
Figure 5:
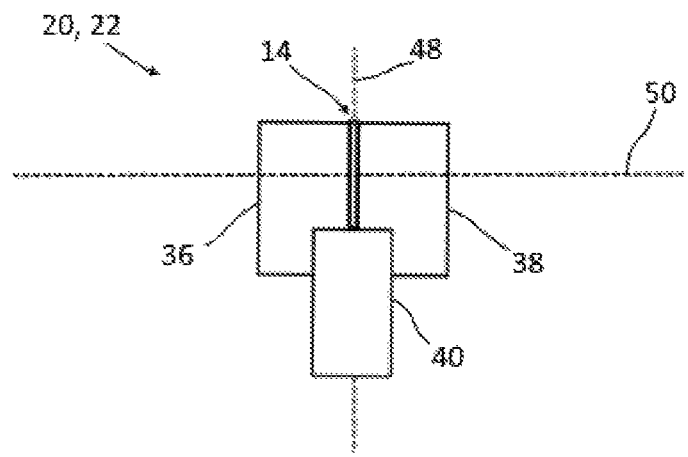
FIG. 5 is a schematic illustration showing the blade guide assemblies of the band saw of FIG. 1 at a third angular position.

The open space between the upper wheel house and the table is referred to herein as the cutting zone 34. The blade guide assemblies 20, 22 are arranged on either side of the cutting zone 34 (i.e., above and below) and are configured to confine the blade 14 to maintain an accurate cutting path through the cutting zone. Referring to FIGS. 3-5, each blade guide assembly 20, 22 includes a pair of side guides 36, 38 and a thrust guide 40. The side guides 36, 38 are arranged on both sides of the blade 14 and together serve to control the angle of the blade 14 through the cutting zone 34. The thrust guide 40 supports the back edge blade to resist feed force (i.e., the force of the workpiece being fed against the blade). The side guides 36, 38 and the thrust guide 40 may be individually adjustable with respect to each other to accommodate different blade widths and thicknesses.

At least one of the guide assemblies 20, 22 is configured to be vertically adjustable to expand or narrow the distance between the guide assemblies. In the embodiment of FIG. 1, the upper guide assembly 20 is vertically adjustable. This enables the upper guide assembly to be positioned in close proximity to the upper surface of a workpiece being cut to maximize blade control in the cutting zone. The band saw may include a blade guard 42 which extends downwardly from the upper wheel house and covers an upper section of the blade.

In accordance with this disclosure, the upper and lower guide assemblies 20, 22 are configured to pivot or rotate about a longitudinal axis of the blade 14 in order to alter the angle of the blade with respect to a wheel contact plane 50 (FIGS. 3-5) in the cutting zone. The upper and lower guide assemblies 20, 22 are each configured to be selectively and releasably locked at at least two different angular positions with respect to the longitudinal axis of the blade.

When the upper and lower guide assemblies 20, 22 are arranged at a first angular position, such as depicted in FIG. 3, the blade 14 is held with the blade plane 48 oriented at 0° with respect to the wheel contact plane 50. In other words, the blade plane 48 is substantially coplanar with the wheel contact plane 50 at the first angular position. The upper and lower guide assemblies are capable of being pivoted or rotated from the first angular position to at least a second angular position, such as depicted in FIGS. 4 and 5.

At the second angular position, the blade plane 48 may be oriented at 45°, such as depicted in FIG. 4, or 90°, such as depicted in FIG. 5, or anywhere in between, with respect to the wheel contact plane 50. The upper and lower guide assemblies 20, 22 are each configured to be releasably locked at the first and second angular positions. The upper and lower guide assemblies 20, 22 may be configured to be pivoted to and releasably locked at more than two angular positions. For example, the upper and lower guide assemblies may be configured to be pivoted to both a second angular position, such as depicted in FIG. 4, and a third angular position, such as depicted in FIG. 5.

The guide assemblies 20, 22 may be configured to be pivoted and releasably locked at the different angular positions in any suitable manner. In one embodiment, the guide assemblies 20, 22 are configured such that they are locked in position while the blade is tensioned and capable of being pivoted only when the tension on the blade is released, e.g., by the tensioning mechanism 26.

Figure 2:
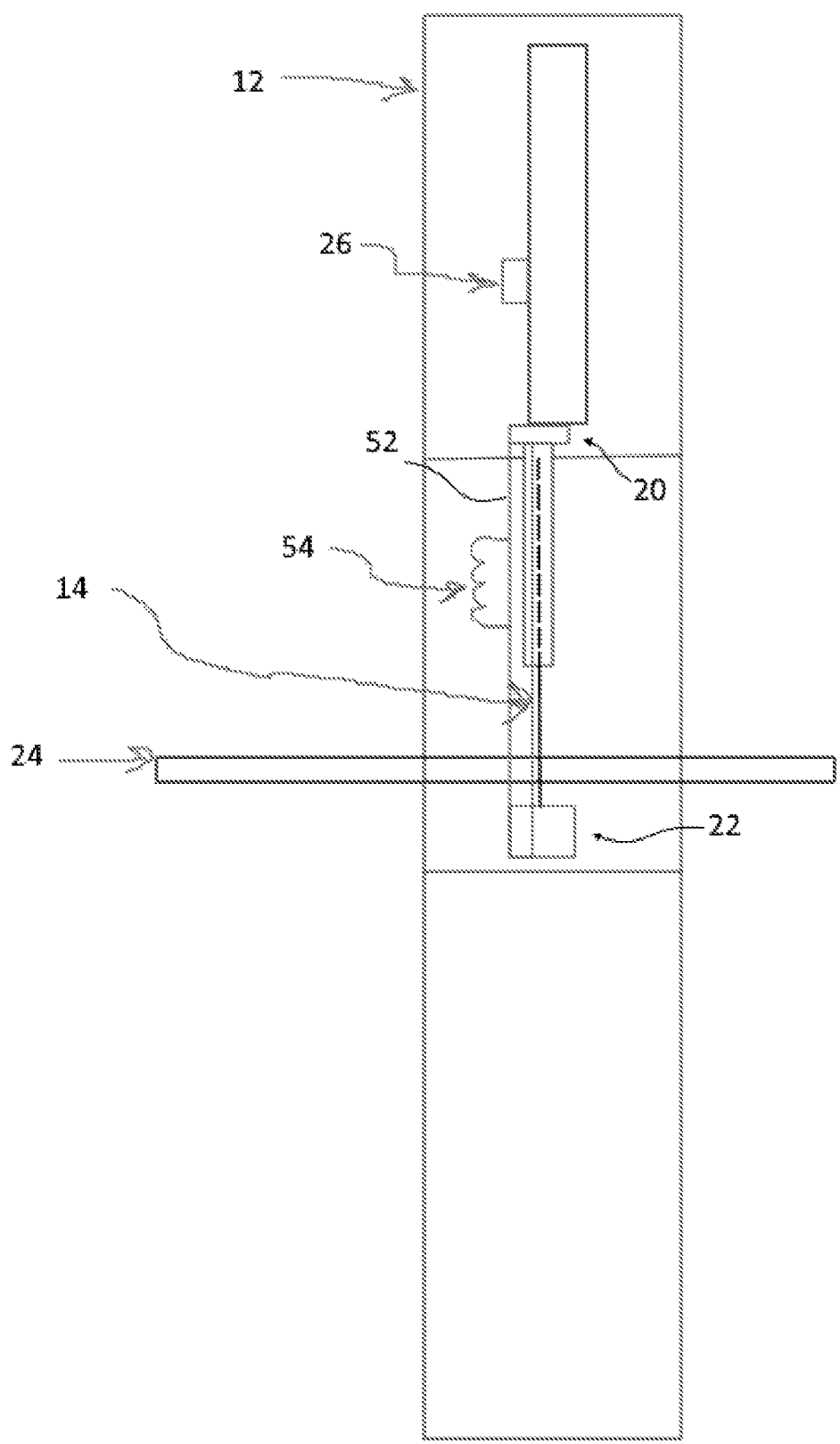
FIG. 2 is a schematic front view of the band saw of FIG. 1.

Referring to FIGS. 1 and 2, to make changing the position of the guide assemblies 20, 22 more efficient, the guide assemblies 20, 22 may be coupled to a lever arm 52. The lever arm is coupled to both guide assemblies 20, 22. The lever arm may be pivoted manually by an operator of the band saw via handle 54 which in turn causes the guide assemblies 20, 22 to pivot between the different angular positions.

As can be seen in FIG. 1, the lever arm 52 may be shaped to minimize any interference with the cutting capacity of the band saw. For example, the lever arm 52 may have a sideways U shape which is configured to extend around the cutting zone of the band saw. To ensure that the lever arm 52 does not interfere with the cutting capacity of the band saw, the lever arm 52 may be configured to be decoupled from the guide assemblies 20, 22 so that the lever arm 52 can be returned to a stored position when not in use. For example, as depicted in FIG. 1, the lever arm 52 has hinges 56 which enable the lever arm 52 to be folded out of the way when not in use. In alternative embodiments, the lever arm 52 may be detachable from the guide assemblies 20, 22 when not in use.

As is known in the art, twisting the blade alters the travel length of the blade and therefore changes the tension requirement of the blade. Therefore, the blade may have different tension requirements when oriented at 90°, 45°, and 0°. To facilitate blade tensioning at different blade orientations, the blade tensioning mechanism 26 may be configured to have a different set point tension position for each blade orientation. For example, the blade tensioning mechanism has a first position which tensions the blade when the blade is oriented at 0°, a second position which tensions the blade when the blade is twisted, e.g., at 45°, and a third position which relaxes tension on the blade so that the blade can be removed and to enable the blade guide assemblies to be pivoted.

The blade tensioning mechanism 26 may comprise a lever which is configured to alter the position of the upper wheel 16 by predetermined amounts to adjust the tension of the blade for each set point position. In alternative embodiments, the blade tensioning mechanism 26 may comprise an automatic tensioning mechanism that utilizes an adjustable known spring to automatically adjust the position of the upper wheel to accommodate variation in blade length due to twist with minimal to no change in blade tension.

Figure 6:
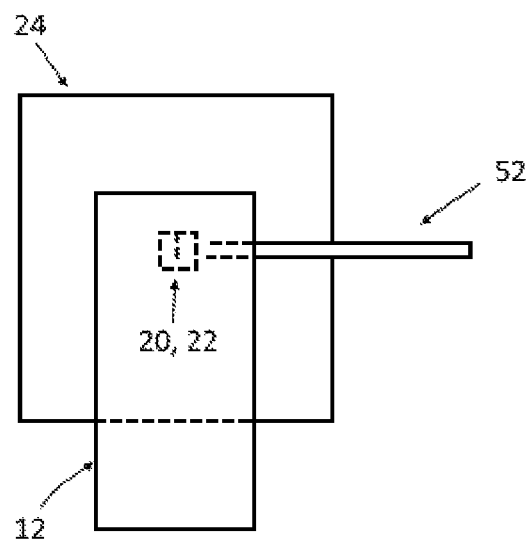
FIG. 6 is a schematic illustration of the blade guide assemblies rotationally coupled to the table with the blade guide assemblies and table in a first angular position.
Figure 7:
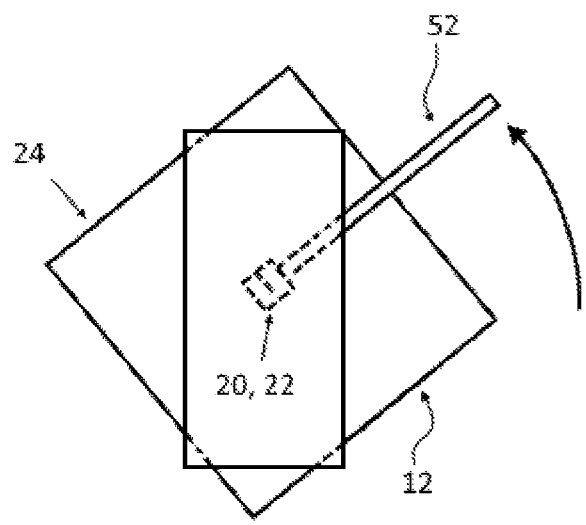
FIG. 7 is a schematic illustration of the blade guide assemblies rotationally coupled to the table with the blade guide assemblies and table rotated to a second angular position.

As noted above, the table 24 may be configured to be beveled about a bevel axis. The table is configured such that the bevel axis is parallel to the plane of the blade. In one embodiment, the table 24 may be rotationally linked to the lower blade guide assembly 22 so that, when the lower blade guide assembly 22 is pivoted between the first and second positions, the table 24 turns as well, as can be seen in FIGS. 6 and 7. FIG. 6 shows the guide assemblies 20, 22 in the first position. The lever arm 52 is used to turn the blade guide assemblies 20, 22 to the second position which also results in the turning of the table 24 (FIG. 7). This enables the bevel axis to remain parallel to the plane of the blade when the blade angle through the cutting zone is changed.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A band saw comprising:
a frame;
a first wheel and a second wheel supported by the frame;
a band saw blade wrapped around the first wheel and the second wheel and held in tension between the first wheel and the second wheel;
a first blade guide assembly and a second blade guide assembly which guide the band saw blade through a cutting zone, the first blade guide assembly being arranged on a first side and the second blade guide assembly being arranged on a second side of the cutting zone; and wherein the first wheel and the second wheel define a tangential wheel contact plane that extends through the cutting zone, wherein the first blade guide assembly and the second blade guide assembly are each supported for pivotal movement about a pivot axis between a first angular position and a second angular position, the first blade guide assembly and the second blade guide assembly each being selectively lockable in the first angular position and the second angular position, wherein, at the first angular position, the first and the second blade guide assemblies hold the band saw blade at a first angle with respect to the wheel contact plane with the band saw blade tensioned for cutting, wherein, at the second angular position, the first and the second blade guide assemblies hold the band saw blade at a second angle with respect to the wheel contact plane with the band saw blade tensioned for cutting, the second angle being different than the first angle, and further comprising:
    a lever arm that extends between and connects the first blade guide assembly and the second blade guide assembly, the lever arm being configured to be moved manually by an operator of the band saw to pivot the first blade guide assembly and the second blade guide assembly simultaneously between the first angular position and the second angular position.

2. The band saw of claim 1, wherein the first angle is 0° and the second angle is at least 45°.

3. The band saw of claim 1, wherein the first and the second blade guide assemblies are each pivotable to and selectively lockable at a third angular position, and
    wherein, at the third angular position, the first and the second blade guide assemblies hold the band saw blade at a third angle with respect to the wheel contact plane, the third angle being different than the first angle and the second angle.

4. The band saw of claim 3, wherein the first angle is 0°, the second angle is 45°, and the third angle is 90°.

5. The band saw of claim 1, wherein the lever arm configured to be decoupled from the first blade guide assembly and the second blade guide assembly and moved to a stored position.

6. The band saw of claim 1, further comprising:
a blade tensioning mechanism operably coupled to at least one of the wheels and having at least three positions of tension, the blade tensioning mechanism having a first position for tensioning the blade when the blade is oriented at the first angle in the cutting zone, a second position for tensioning the blade when the blade is oriented at the second angle in the cutting zone, and a third positioning for relaxing tension in the blade.

7. The band saw of claim 1, further comprising:
a table for supporting a workpiece to be cut by the band saw blade in the cutting zone, wherein the first blade guide assembly is positioned above the table and the second blade guide assembly is positioned below the table, and wherein the table is rotationally coupled to the second blade guide assembly such that the table rotates with the second blade guide assembly between the first angular position and the second angular position.

8. The band saw of claim 7, wherein the table is configured to be tilted about a bevel axis, the bevel axis intersecting the cutting path when the second blade guide assembly is in both the first angular position and the second angular position.

9. A band saw comprising:
a frame;
a first wheel and a second wheel supported by the frame;
a band saw blade wrapped around the first wheel and the second wheel and held in tension between the first wheel and the second wheel; and
a first blade guide assembly and a second blade guide assembly which guide the band saw blade through a cutting zone, the first blade guide assembly being arranged on a first side and the second blade guide assembly being arranged on a second side of the cutting zone, and
a blade tensioning mechanism operably coupled to at least one of the wheels and configured to adjust tension of the band saw blade,
wherein the first blade guide assembly and the second blade guide assembly are each pivotal about a pivot axis between a first angular position and a second angular position,
wherein, at the first angular position, the first and the second blade guide assemblies hold the band saw blade at a first angle with respect to a wheel contact plane,
wherein, at the second angular position, the first and the second blade guide assemblies hold the band saw blade at a second angle with respect to the wheel contact plane, the second angle being different than the first angle, and
wherein the blade tensioning mechanism has a first position for tensioning the blade when the blade is oriented at the first angle in the cutting zone, a second position for tensioning the blade when the blade is oriented at the second angle in the cutting zone, and a third positioning for relaxing tension in the blade,
further comprising:
    a lever arm that extends between and connects the first blade guide assembly and the second blade guide assembly, the lever arm being configured to be moved manually by an operator of the band saw to pivot the first blade guide assembly and the second blade guide assembly simultaneously between the first angular position and the second angular position.

10. The band saw of claim 9, wherein the first angle is 0° and the second angle is at least 45°.

11. The band saw of claim 10, wherein the lever arm is configured to be decoupled from the first blade guide assembly and the second blade guide assembly and moved to a stored position.

* * * * *